Patented Apr. 26, 1938

2,115,524

UNITED STATES PATENT OFFICE 2,115,524

PLASTIC COMPOSITIONS

Carroll A. Hochwalt and Nicholas N. T. Samaras, Dayton, Ohio, assignors to Monsanto Chemical Company, St. Louis, Mo., a corporation of Delaware No Drawing. Application January 15, 1937, Serial No. 120,740

7 Claims. (Cl. 106—22)

The present invention relates to plastic compositions containing phenol-aldehyde resins, and, more particularly, to a class of substances that function as plasticizers for such compositions.

In order to avoid brittleness or to impart flexibility, it is common practice to add plasticizing substances to phenol-aldehyde resins to be used for molding and laminating compositions. The preferred materials which are most commonly used are esters such as dibutyl phthalate, tricresyl phosphate and certain vegetable oils. While the use of plasticizers improves the product, it is attended with certain disadvantages; for example, many of these plasticizers retard the rate of cure and produce a soft product. This is particularly true if the quantity of plasticizer required is substantial. Moreover, the strength and toughness of the article diminishes rapidly with increased quantity of plasticizer. In view of the foregoing it is evident that the use of a plasticizer is somewhat of a compromise between flexibility, on the one hand, and strength and speed of cure, on the other.

We have found that a class of substances, whose property to plasticize phenol-aldehyde resins has not been previously recognized, is of particular value and possesses certain marked improvements over the materials recommended heretofore. The class of compounds, whose use is contemplated by the present invention, are unusual in that comparatively minute amounts are sufficient to develop the plasticity and flowability required, and at the same time preserve to a marked degree the desirable molding properties of unplasticized phenol-aldehyde products.

The class of compounds found effective for this purpose are alkylated and hydrogenated diphenyl and diphenylbenzene derivatives. They can be incorporated and are compatible in small proportions with phenol-aldehyde resins. These compounds increase the flow of compositions containing these resins to a remarkable extent, without increasing the curing time or affecting the resulting product adversely.

The diphenyl derivatives which have been found exceptionally effective in small amounts as plasticizers for use in small proportions according to the method of the invention are dicyclohexyl and less completely hydrogenated diphenyl hydrocarbons, ethyldiphenyl, diethyldiphenyl, propyldiphenyl and similar mono and polyalkylated diphenyl derivatives. The corresponding diphenylbenzene derivatives, both hydrogenated and alkylated, have also proved effective. For the purpose of the invention the products having higher boiling points than diphenyl that result as by-products in the pyrolytic conversion of benzene to diphenyl are also suitable materials for conversion by hydrogenation or alkylation into plasticizers. Especially valuable and inexpensive plasticizers of this class are the products of low freezing point obtained by the reaction of ethylene, propylene and similar gaseous olefins with diphenyl in the presence of aluminum chloride.

In the practice of the invention the plasticizer is preferably incorporated with the compositions prior to the hot-milling operation. Thus, the plasticizing substance can be incorporated (1) during the original resin condensation, or (2) by fusing or milling with the resin after it is formed, or (3) during the compounding operation, when it is added, either with or without an extender or diluent, at the stage when the filler, resin, coloring material, hardening agent, etc. are mixed. By whatever method the incorporation is effected, the resulting powdered composition is then hot-milled either on rolls or preferably in a Banbury mixer. It is during this operation that the plasticizer is especially effective inasmuch as it permits longer and more thorough milling of the composition and thus permits better incorporation of the ingredients. This hot-milling, as is well known, is a critical stage of the procedure but with the plasticizers of the invention a greater degree of variation is permissible without undesirable effects resulting. The degree to which the product is to be hot-milled is determined by previous experience and tests. The product, if hot-milled on rolls, will be a brittle sheet when cool. The sheet is then pulverized and the resulting powder is ready for the final molding operation. The molding operation is conducted as heretofore except that with the plasticizers of the invention the time for closing of the mold is shorter because of the resulting increase in flow produced by the incorporation of the plasticizer and the curing time is substantially the same as that which would be used with the unplasticized composition. No great changes in the compounding, hot-milling, or molding are therefore necessitated in using the invention.

The proportion of plasticizer to use will vary with the particular resin and composition. Ordinarily, up to 1 or sometimes as much as 2 parts by weight to 100 parts by weight of the composition is ample. When larger proportions are used the composition has a tendency to flow too freely on hot rolls and produce "bunching" thereon. Larger proportions if desired can be incorporated when the hot-milling is conducted in a Banbury or similar mechanical mixer.

Examples of preferred methods of practicing the invention and some of the advantages accruing therefrom are illustrated hereinbelow.

*Example I.*—The following ingredients, all having a fineness of at least 100 mesh, were milled together for about 20 minutes. This mixture is referred to as the "standard mixture" and is so designated throughout the examples.

|  | Parts by weight |
|---|---|
| Phenol-formaldehyde resin (2-stage type) | 45.05 |
| Wood flour | 45.05 |
| Nubian resin black | 1.8 |
| Calcium hydroxide | 2.7 |
| Calcium stearate | 0.9 |
| Hexamethylenetetramine | 4.5 |

The mixture was then rolled out on hot rolls maintained at about 230° F. in the known manner. With a 160-gram batch of the mixture on 12 inch rolls spaced to give a sheet of 0.03 inch thick and rotating at about 30 revolutions per second, about 180 seconds were required to produce a satisfactory sheet or "blanket". After cooling, this blanket was ground to about 14-mesh fineness and molded in two different molds, a standard flash-type cup mold and a positive disc mold, at a temperature of 340° F. under a pressure of 2500 lbs. per square inch.

The period required for the flash-type mold to close during the molding of this composition was 39 seconds. The curing time in the flash-type cup mold was 150 seconds and in the positive disc mold, 50 seconds. A good, hard cure was obtained in both molds under these conditions.

*Example II.*—To the standard mixture of Example I was added 0.5 part by weight of hydrogenated diphenyl (dicyclohexyl) and the composition was treated as in Example I.

In this case the period required for the flash-type mold to close during the molding of the composition was 28 to 29 seconds. The cure required in both the flash-type cup mold and the positive disc mold was not changed, being 150 and 50 seconds, respectively.

*Example III.*—Slightly more hydrogenated diphenyl (dicyclohexyl) was added to the standard mixture of Example I until the total hydrogenated diphenyl amounted to 0.8 part by weight. The procedure followed was exactly the same as that used in Example I.

The molding and curing characteristics of this composition were not substantially different from those obtained with the addition of 0.5% of hydrogenated diphenyl as a plasticizer (Example II).

*Example IV.*—Following the procedure of Example I, a molding composition containing 1.5 parts by weight of ethyldiphenyl were added to the standard mixture.

In molding, it was observed that the time required for the flash-type cup mold to close was reduced to 25 to 26 seconds. The cure was slightly retarded to 180 seconds in the flash-type cup mold and 70 seconds in the positive disc mold. The composition was more plastic than any prepared in the preceding examples.

When naphthalene and anthracene are used as plasticizing agents, in comparative tests, the period of cure is appreciably retarded and the resulting molded product has the appearance of a "soft cured" plastic. These results and similar comparative results with other substances are shown in the following table.

*Table.—Curing properties in flash-type mold at 340° F. and 2500 lbs. per square inch*

| Plasticizer | Percent added | Closing time (seconds) | Cure |
|---|---|---|---|
|  |  |  | *Seconds* |
| None | | 39 | O. K. in 150 |
| Ethyldiphenyl | 1.5 | 25–26 | O. K. in 180 |
| Dicyclohexyl | 0.5 | 28–29 | O. K. in 150 |
| Dicyclohexyl | 0.8 | 28–29 | O. K. in 150 |
| Decalin | 3.0 | 19 | Soft in 180 |
| Naphthalene | 3.0 | 24 | Soft in 240 |
| Tetralin | 3.0 | 26 | Soft in 200 |
| Tetralin | 9.0 | 15 | Blistered in 240 |
| Anthracene | 3.0 | 27 | Blistered in 220 |
| Anthracene | 9.0 | 21 | Soft in 180 |

Although the examples illustrate the action of the plasticizing agents of the invention in phenol-formaldehyde resins, their effectiveness is not restricted to this particular class of compounds. They produce similar results in urea-aldehyde resins and similar thermosetting or heat-hardening resins, as well as in thermoplastic resins, such as the vinyl resins, acrylic acid resins, styrene resins, and the like. However, with thermoplastic compositions their action on the cure is not as decisive a criterion as in the case of thermosetting compositions. The term "phenol-aldehyde resin" as used throughout the specification and in the claims is to be understood to be generic in significance, that is, it embraces resinous condensation products of aldehyde and phenols in general; phenols, such as phenol itself, phenolic tars, cresols, and xylenols, are included.

As a result of the increase in flowability imparted during the thermal setting operation and the increased flexibility of the resulting molded product, the compounds of the invention are of exceptional value for use in the field of laminated molded products, especially for the production of so-called punch stock. The production of such products is well understood in the art and in the practice of the invention in this field no changes or modifications from the usual practice are necessitated. For this use, the compounds of the invention are added to a solution or varnish containing the resin.

Inasmuch as the specification comprises preferred embodiments of the invention, it is to be understood that these are illustrative rather than restrictive and that changes and modifications are contemplated in these compositions and procedures to adapt the invention to other specific applications. The invention is therefore to be limited only by the scope of the appended claims.

What we claim is:

1. A molding composition embodying a thermosetting phenol-aldehyde resin, a filler and not more than 10% by weight of a diphenyl derivative selected from the group consisting of hydrogenated diphenyls, hydrogenated diphenylbenzenes, alkylated diphenyls and alkylated diphenylbenzenes, said diphenyl derivative being present in an amount sufficient to increase the flowability of the composition during the molding.

2. A molding composition embodying a thermosetting phenol-aldehyde resin, a filler and not more than 10% by weight of a diphenyl derivative selected from the group consisting of hydrogenated diphenyls, hydrogenated diphenylbenzenes, alkylated diphenyls and alkylated diphenylbenzenes, said diphenyl derivative being present in an amount sufficient to impart to the resulting molded product an increased flexibility.

3. A composition as defined in claim 1, in which the diphenyl derivative is an incompletely hydrogenated diphenyl.

4. A composition as defined in claim 1, in which the diphenyl derivative is dicyclohexyl.

5. A composition as defined in claim 1, in which the diphenyl derivative is a mixture of alkylated diphenyls.

6. The method of increasing the flowability of a phenol-aldehyde-resin-containing molding composition during molding by adding thereto a diphenyl derivative selected from the group consisting of hydrogenated diphenyls, hydrogenated diphenylbenzenes, alkylated diphenyls and alkylated diphenylbenzenes, said diphenyl derivative being present in an amount sufficient to increase the flowability of the composition during the molding.

7. A molded phenol-aldehyde resin product of increased flexibility characterized in that it contains a diphenyl derivative selected from the group consisting of hydrogenated diphenyls, hydrogenated diphenylbenzenes, alkylated diphenyls and alkylated diphenylbenzenes, said diphenyl derivative being present in a proportion not substantially in excess of 10% by weight of the product.

CARROLL A. HOCHWALT.
NICHOLAS N. T. SAMARAS.